United States Patent
Sakata

(10) Patent No.: US 10,838,292 B2
(45) Date of Patent: Nov. 17, 2020

(54) LIGHT SOURCE APPARATUS, ILLUMINATOR, AND PROJECTOR

(71) Applicant: SEIKO EPSON CORPORATION, Tokyo (JP)

(72) Inventor: Hidefumi Sakata, Kamiina-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 253 days.

(21) Appl. No.: 16/046,372

(22) Filed: Jul. 26, 2018

(65) Prior Publication Data

US 2019/0041734 A1 Feb. 7, 2019

(30) Foreign Application Priority Data

Aug. 3, 2017 (JP) ................................. 2017-150826

(51) Int. Cl.
G03B 21/20 (2006.01)

(52) U.S. Cl.
CPC ......... *G03B 21/208* (2013.01); *G03B 21/204* (2013.01); *G03B 21/2066* (2013.01); *G03B 21/2073* (2013.01)

(58) Field of Classification Search
CPC .... G03B 21/14; G03B 21/145; G03B 21/204; G03B 21/208; G03B 21/2013; G03B 21/2033; G03B 21/2053; G03B 21/2066
See application file for complete search history.

(56) References Cited

U.S. PATENT DOCUMENTS

| | | | | |
|---|---|---|---|---|
| 9,661,285 B2* | 5/2017 | Miyamae | ............ | H04N 9/3105 |
| 9,716,869 B2* | 7/2017 | Nakajima | ............ | G02B 5/3083 |
| 2007/0058274 A1* | 3/2007 | Singer | ................. | G03F 7/70233 |
| | | | | 359/857 |
| 2008/0079913 A1* | 4/2008 | Inoue | ................. | G02B 19/0014 |
| | | | | 353/85 |
| 2015/0029475 A1* | 1/2015 | Shimizu | ............... | H04N 9/3161 |
| | | | | 353/98 |
| 2016/0050400 A1* | 2/2016 | Terasaki | ............. | G03B 21/2013 |
| | | | | 353/20 |

FOREIGN PATENT DOCUMENTS

JP 2013-120250 A 6/2013

* cited by examiner

*Primary Examiner* — Sultan Chowdhury
(74) *Attorney, Agent, or Firm* — Oliff PLC

(57) ABSTRACT

A light source apparatus that irradiates an illuminated area with illumination light includes at least one light source that emits light and at least one beam shaping element that includes a first optical element and a second optical element and provides a beam shaping effect of shaping the cross-sectional shape of the light to produce the illumination light. The first optical element provides the beam shaping effect. The second optical element has one of the function of outputting, when part of the light is incident on the second optical element, the part of the light in the same direction in which the part of the light travels immediately before the incidence on the second optical element and the function of deflecting, when part of the light is incident on the second optical element, the part of the light toward the illuminated area and outputting the deflected light.

20 Claims, 13 Drawing Sheets

LIGHT SOURCE APPARATUS, ILLUMINATOR, AND PROJECTOR

BACKGROUND

1. Technical Field

The present invention relates to a light source apparatus, an illuminator, and a projector.

2. Related Art

A laser light source has been receiving attention as the light source for a projector. For example, JP-A-2013-120250 discloses a light source apparatus in which excitation light formed of laser light is caused to be incident on a phosphor layer for generation of fluorescence. In the light source apparatus, the cross-sectional shape of the excitation light on the phosphor layer is shaped with a diffuser for efficient generation of the fluorescence.

In the light source apparatus described above, however, in a case where the laser light source is mounted with low precision, the traveling direction of the excitation light diffused with the diffuser extends off the phosphor, and the excitation light is undesirably not incident on a predetermined area of the phosphor layer.

SUMMARY

An advantage of some aspects of the invention is to provide a light source apparatus that reduces the magnitude of an effect that can occur in a case where the traveling direction of light emitted from a light source deviates from a predetermined direction. Another advantage of some aspects of the invention is to provide an illuminator including the light source apparatus. Another advantage of some aspects of the invention is to provide a projector including the illuminator.

According to a first aspect of the invention, a light source apparatus that irradiates an illuminated area with illumination light is provided. The light source apparatus includes at least one light source that emits light and at least one beam shaping element that includes a first optical element and a second optical element and provides a beam shaping effect of shaping a cross-sectional shape of the light to produce the illumination light. The first optical element is provided in an area containing a center of the beam shaping element in a plan view viewed in a direction in which a principal ray of the light is incident on the beam shaping element and the first optical element provides the beam shaping effect, and the second optical element is provided in an end portion of the beam shaping element and has one of a function of outputting, when part of the light is incident on the second optical element, the part of the light in a same direction in which the part of the light travels immediately before the incidence on the second optical element and a function of deflecting, when part of the light is incident on the second optical element, the part of the light toward the illuminated area and outputting the deflected light.

The light source apparatus according to the first aspect reduces the amount of illumination light that extends off the illuminated light is reduced and can therefore reduce the magnitude of an effect that can occur in a case where the traveling direction of the light emitted from the light source deviates from a predetermined direction.

In the first aspect described above, it is preferable that the second optical element has a cylindrical surface having a generatrix parallel to a first direction in which the first and second optical elements are arranged.

According to the configuration described above, since the second optical element further has the function of refracting part of the light in the direction perpendicular to the generatrix, the optical power density on the illuminated area can be lowered.

In the first aspect described above, it is preferable that the second optical element has a deflection surface having refractive power that deflects the part of the light toward the illuminated area.

According to the configuration described above, the magnitude of the effect of deviation of the traveling direction of the light can be reduced.

In the first aspect described above, it is preferable that the second optical element includes a flat plate section formed of a flat plate.

According to the configuration described above, since the second optical element can output the part of the light in the same direction in which the part of the light travels immediately before the incidence on the second optical element, the magnitude of the effect of deviation of the traveling direction of the light can be reduced.

In the first aspect described above, it is preferable that the second optical element includes an anisotropic diffuser element.

According to the configuration described above, since the second optical element can diffuse the light in a direction where no deviation of the traveling direction of the light occurs, the optical power density on the illuminated area can be lowered.

In the first aspect described above, it is preferable that the first optical element is formed of a diffuser element.

According to the configuration described above, the diffuser element can provide a desired beam shaping effect.

In the first aspect described above, it is preferable that the first optical element is formed of a lens having a free-form surface.

According to the configuration described above, the free-form surface can provide an arbitrary beam shaping effect.

In the first aspect described above, it is preferable that let an x axis and a y axis be two axes perpendicular to each other in a plane perpendicular to an optical axis of the lens, and the free-form surface has a shape defined by Expression (1) having variables x and y.

$$z = \frac{cr^2}{1 + \sqrt{1 - (1+k)c^2 r^2}} + \sum_{j=2}^{s} c_j x^m y^n \quad (1)$$

According to the configuration described above, a free-form surface that provides a desired beam shaping effect can be designed.

In the first aspect described above, it is preferable that the light source apparatus further includes a light collection system provided on a downstream side of the at least one beam shaping element, that the at least one light source includes a plurality of light sources, that the at least one beam shaping element includes a plurality of beam shaping elements provided in correspondence with the plurality of light sources, and that the light collection system has a function of collecting a plurality of light beams having been emitted from the plurality of light sources and having passed through the plurality of corresponding beam shaping elements and directing the collected light beams toward the illuminated area.

According to the configuration described above, the plurality of light beams having passed through the plurality of beam shaping elements can be superimposed on one another on the illuminated area.

In the first aspect described above, it is preferable that the plurality of beam shaping elements form a beam shaping element array, that the second optical element of each of first beam shaping elements that form a contour of the beam shaping element array out of the plurality of beam shaping elements is provided along the contour, that the plurality of light sources include first light sources corresponding to the first beam shaping elements, and that the second optical element of each of the first beam shaping elements has refractive power that deflects a component emitted from the corresponding first light source and incident on the second optical element of the first beam shaping element toward the illuminated area.

According to the configuration described above, in a case where the traveling direction of the light incident on each of the first beam shaping elements deviates in a direction that causes the light to extend off the contour and part of the light is incident on the second optical element, the part of the light can be deflected toward the illuminated area. The magnitude of the effect of deviation of the traveling direction of the light can therefore be reduced.

According to a second aspect of the invention, an illuminator is provided. The illuminator includes the light source apparatus according to the first aspect described above and a diffused light generating element that receives the illumination light outputted from the light source apparatus and generates diffused light.

In the illuminator according to the second aspect, illumination light can be efficiently incident on the diffused light generating element, which is the illuminated area. Bright diffused light can therefore be produced.

According to a third aspect of the invention, a projector is provided. The projector includes the illuminator according to the second aspect, a light modulator that modulates light from the illuminator in accordance with image information to produce image light, and a projection system that projects the image light.

The projector according to the third aspect can display a bright image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
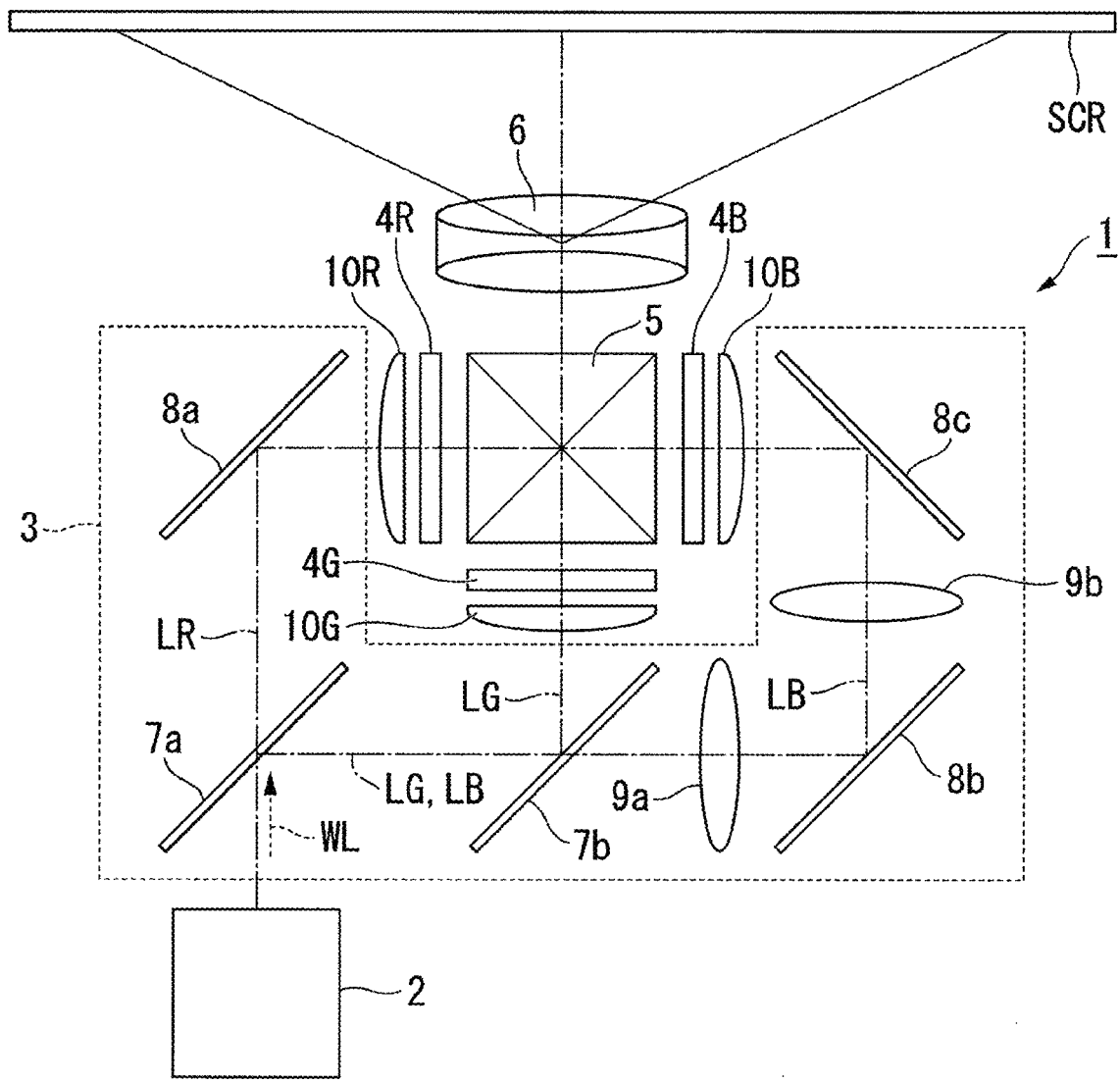
FIG. 1 shows a schematic configuration of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a projector according to the present embodiment will first be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes an illuminator 2, a color separation system 3, a light modulator 4R, a light modulator 4G, a light modulator 4B, a light combining system 5, and a projection system 6.

The color separation system 3 separates white light WL into red light LR, green light LG, and blue light LB. The color separation system 3 includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the white light WL from the illuminator 2 into the red light LR and the other light (green light LG and blue light LB). The first dichroic mirror 7a transmits the separated red light LR and reflects the other light. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

The first relay lens 9a and the second relay lens 9b are disposed in the optical path of the blue light LB and on the downstream side of the second dichroic mirror 7b.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

A transmissive liquid crystal panel is, for example, used as each of the light modulators 4R, 4G, and 4B. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively.

The image light fluxes from the light modulators 4R, 4G, and 4B are incident on the light combining system 5. The light combining system 5 combines the image light fluxes with one another and causes the combined image light to exit toward the projection system 6. A cross dichroic prism is, for example, used as the light combining system 5.

The projection system 6 is formed of a projection lens group, enlarges the combined image light from the light combining system 5, and projects the enlarged image light toward the screen SCR. Enlarged color video images are thus displayed on the screen SCR.

Illuminator

Figure 2:
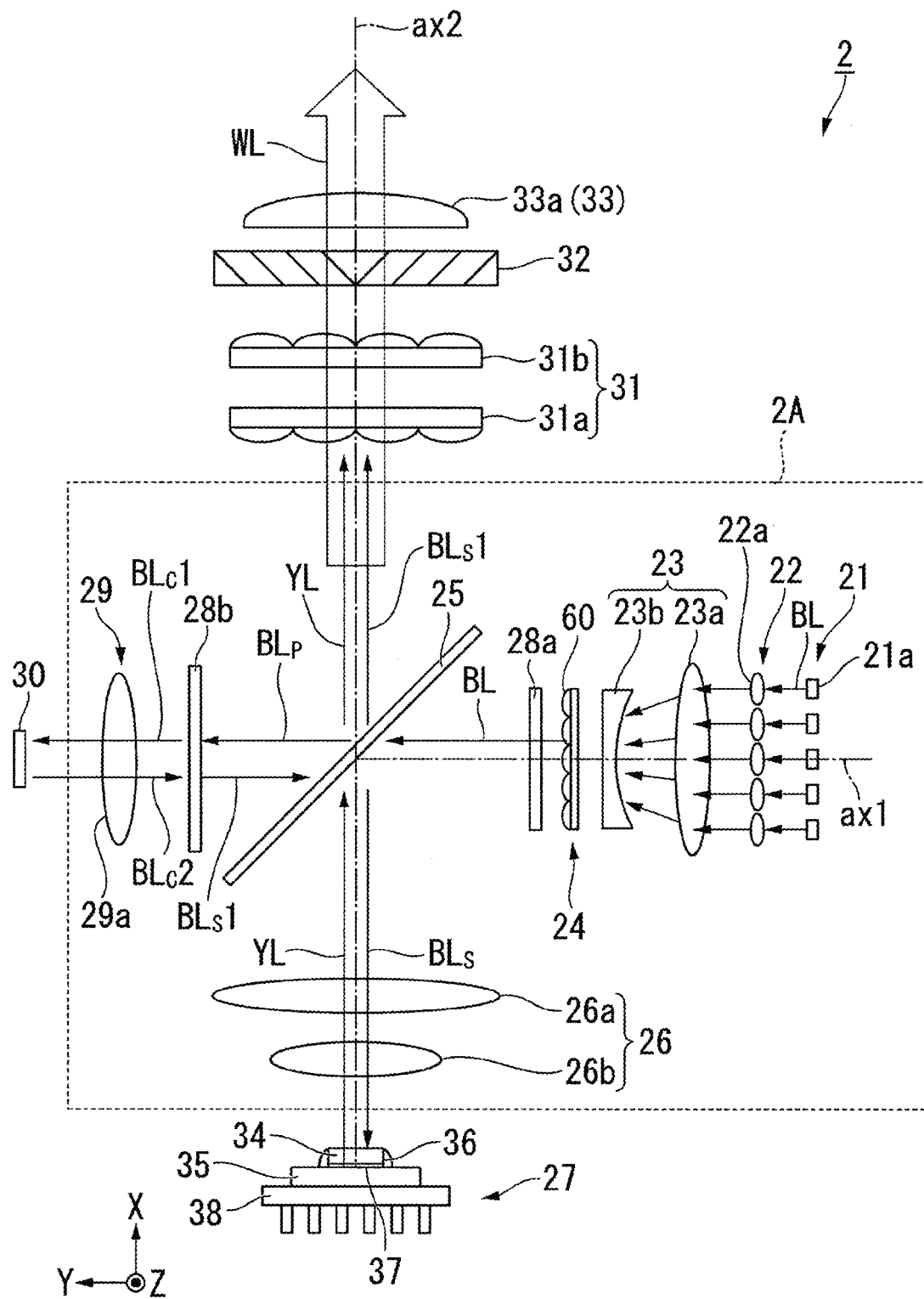
FIG. 2 shows a schematic configuration of an illuminator.

The illuminator 2 according to an embodiment of the invention will subsequently be described. FIG. 2 shows a schematic configuration of the illuminator 2. The illuminator 2 includes a light source apparatus 2A, a fluorescence emitting element 27, a diffusive reflection element 30, an optical integration system 31, a polarization conversion element 32, and a superimposing lens 33a, as shown in FIG. 2. In the present embodiment, the optical integration system 31 and the superimposing lens 33a form a superimposing system 33.

The light source apparatus 2A includes an array light source 21, a collimator system 22, an afocal system 23, a light shaping element array 24, a first retardation film 28a, a polarization separation element 25, a first light collection system 26, a second retardation film 28b, and a second light collection system 29.

In the illuminator 2, the array light source 21, the collimator system 22, the afocal system 23, the light shaping element array 24, the first retardation film 28a, the polarization separation element 25, the second retardation film 28b, the second light collection system 29, and the diffusive reflection element 30 are sequentially arranged along an optical axis ax1 of the array light source 21. On the other hand, the fluorescence emitting element 27, the first light collection system 26, the polarization separation element 25, the optical integration system 3l, the polarization conversion element 32, and the superimposing lens 33a are sequentially arranged along an illumination optical axis ax2. The optical axis ax1 and the illumination optical axis ax2 are present in the same plane and perpendicular to each other.

The description using the drawings will be made by using an XYZ coordinate system. The X direction is the direction parallel to the illumination optical axis ax2. The Y direction is the direction parallel to the optical axis ax1 of the array light source 21. The Z direction is the direction perpendicular to the X and Y directions.

The array light source 21 includes a plurality of semiconductor lasers 21a, which each serve as a solid-state light source. The plurality of semiconductor lasers 21a are arranged in an array in a plane perpendicular to the optical axis ax1 (in XZ plane). The semiconductor lasers 21a each emit, for example, a blue light beam BL (laser light having intensity that peaks at wavelength of 460 nm, for example). The array light source 21 outputs a light beam flux formed of a plurality of light beams BL. In the present embodiment, the semiconductor lasers 21a correspond to the "light source" in the appended claims.

The light beams BL outputted from the array light source 21 enter the collimator system 22. The collimator system 22 converts the light beams BL outputted from the array light source 21 into parallelized light. The collimator system 22 is formed, for example, of a plurality of collimator lenses 22a arranged in an array. The plurality of collimator lenses 22a are disposed in correspondence with the plurality of semiconductor lasers 21a.

The plurality of light beams BL having passed through the collimator system 22 enter the afocal system 23. The afocal system 23 is formed, for example, of a convex lens 23a and a concave lens 23b. The afocal system 23 adjusts the plurality of light beams BL in such a way that the distance therebetween decreases. The light beams BL having passed through the afocal system 23 are incident on the light shaping element array 24.

It is noted that the afocal system 23 is not necessarily required and may be omitted in a case where it is not necessary to adjust the distance between the plurality of light beams BL.

Figure 3:
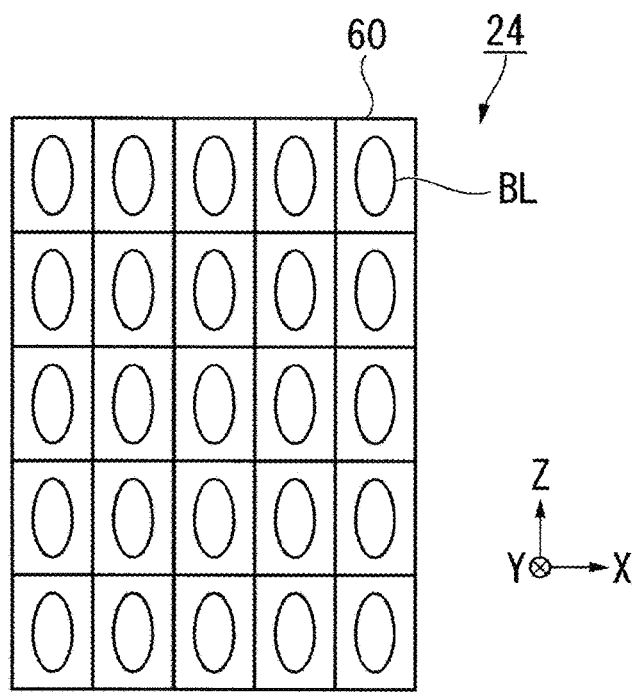
FIG. 3 is a plan view of a light shaping element array viewed along an optical axis.

FIG. 3 is a plan view of the light shaping element array 24 viewed along the optical axis ax1. The light shaping element array 24 includes a plurality of light shaping elements 60 arranged in an array in a plane perpendicular to the optical axis ax1, as shown in FIG. 3. The plurality of light shaping elements 60 correspond to the plurality of semiconductor lasers 21a in the one-to-one relationship. That is, each of the light shaping elements 60 receives the light emitted from the corresponding one of the semiconductor lasers 21a. The plurality of light shaping elements 60 each have a lens surface 60a formed of a non-rotationally-symmetric free-form surface. The lens surface 60a will be described later.

In the present embodiment, the light shaping element array 24 corresponds to the "beam shaping element array" described in the appended claims, and the light shaping elements 60 correspond to the "beam shaping element" described in the appended claims.

The plurality of light beams BL having been emitted from the plurality of semiconductor lasers 21a and having passed through the light shaping element array 24 (plurality of light shaping elements 60) are superimposed on one another in an illuminated area (phosphor layer 34 or diffusive reflection element 30) by the first light collection system 26 or the second light collection system 29, which will be described later.

The configuration of the light shaping element array 24 will be described later in detail.

The light beams BL having passed through the light shaping element array 24 are incident on the first retardation film 28a. The first retardation film 28a is, for example, a half wave plate configured to be rotatable. The light beams BL emitted from the semiconductor lasers 21a are each linearly polarized light. Appropriately setting the angle of rotation of the first retardation film 28a allows each of the light beams BL having passed through the first retardation film 28a to be a light beam containing a S-polarized component and a P-polarized component with respect to the polarization separation element 25 mixed with each other at a predetermined ratio. The ratio between the S-polarized component and the P-polarized component can be changed by rotating the first retardation film 28a.

The light beams BL each containing the S-polarized component and the P-polarized component are incident on the polarization separation element 25. The polarization separation element 25 inclines by 45° with respect to the optical axis ax1 and the illumination optical axis ax2.

The polarization separation element 25 has a wavelength selection characteristic. The polarization separation element 25 has a polarization separation function of separating each of the light beams BL into a light beam $BL_S$, which is formed of the S-polarized light component with respect to the polarization separation element 25, and a light beam $BL_P$, which is formed of the P-polarized light component with respect to the polarization separation element 25.

The polarization separation element 25 further has a color separation function of transmitting fluorescence YL, which belongs to a wavelength band different from the wavelength band to which the light beams BL belong, irrespective of the polarization state of the fluorescence YL.

The S-polarized light beams $BL_S$ reflected off the polarization separation element 25 enter the first light collection system 26. The first light collection system 26 collects the light beams $BL_S$ and directs the collected light beams $BL_S$ toward the phosphor layer 34.

In the present embodiment, the first light collection system 26 is formed, for example, of a first lens 26a and a second lens 26b. The light beams $BL_S$ having exited out of the first light collection system 26 are incident in the form of a collected light flux on the fluorescence emitting element 27. The fluorescence emitting element 27 includes the phosphor layer 34, a substrate 35, which supports the phosphor layer 34, and a fixing member 36, which fixes the phosphor layer 34 to the substrate 35.

In the present embodiment, the phosphor layer 34 is fixed to the substrate 35 via the fixing member 36, which is provided between the side surface of the phosphor layer 34 and the substrate 35. A surface of the phosphor layer 34 or the surface opposite the surface on which the light beams $BL_S$ are incident is in contact with the substrate 35.

The phosphor layer 34 contains a phosphor that absorbs the light beams $BL_S$ and is excited therewith. The phosphor excited with the light beams $BL_S$ emits the fluorescence (yellow light) YL, the intensity of which peaks at a wavelength within a wavelength region ranging, for example, from 500 to 700 nm. In the present embodiment, the phosphor layer 34 corresponds to the "diffused light generating element" described in the appended claims, and the fluorescence YL corresponds to the "diffused light" in the appended claims.

The phosphor layer 34 is preferably made of a material that excels in heat resistance and surface processability. To form the thus characterized phosphor layer 34, it is preferable to use, for example, a phosphor layer in which phosphor particles are dispersed in an inorganic binder, such as alumina, or a phosphor layer formed of sintered phosphor particles with use of no binder.

A reflector 37 is provided on a side of the phosphor layer 34 or the side opposite the side on which the light beams $BL_S$ are incident. The reflector 37 reflects a component of the fluorescence YL produced in the phosphor layer 34 or the component that travels toward the substrate 35.

A heat sink 38 is disposed on a surface of the substrate 35 or the surface opposite the surface that supports the phosphor layer 34.

Part of the fluorescence YL produced in the phosphor layer 34 is reflected off the reflector 37 and exits out of the phosphor layer 34. On the other hand, the remainder of the fluorescence YL produced in the phosphor layer 34 exits out of the phosphor layer 34 without traveling via the reflector 37. The fluorescence YL is thus emitted from the phosphor layer 34 toward the first light collection system 26.

The fluorescence YL emitted from the phosphor layer 34 passes through the first light collection system 26 and the polarization separation element 25 in the presented order and enters the optical integration system 31.

The P-polarized light beams $BL_P$ having passed through the polarization separation element 25 are incident on the second retardation film 28b. The second retardation film 28b is formed of a quarter wave plate disposed in the optical path between the polarization separation element 25 and the diffusive reflection element 30. The light beams $BL_P$ incident on the second retardation film 28b via the polarization separation element 25 are converted by the second retardation film 28b, for example, into right-handed circularly polarized blue light $BL_C1$, which then enters the second light collection system 29.

The second light collection system 29 is formed, for example, of a lens 29a and causes the collected blue light $BL_C1$ to be incident on the diffusive reflection element 30.

The diffusive reflection element 30 diffusively reflects the blue light $BL_C1$ having exited out of the second light collection system 29 toward the polarization separation element 25. The diffusive reflection element 30 preferably not only reflects the blue light $BL_C1$ in a Lambertian reflection scheme but reverses the orientation of the circular polarization.

The light diffusively reflected off the diffusive reflection element 30 is hereinafter referred to as blue light $BL_C2$. According to the present embodiment, diffusively reflecting the blue light $BL_C1$ results in blue light $BL_C2$ having a roughly uniform illuminance distribution. The right-handed circularly polarized blue light $BL_C1$ is reflected in the form of the left-handed circularly polarized blue light $BL_C2$. In the present embodiment, the diffusive reflection element 30 corresponds to the "diffusive light generating element" described in the appended claims, and the blue light $BL_C2$ corresponds to the "diffused light" in the appended claims.

The blue light $BL_C2$ is converted by the second light collection system 29 into parallelized light and then incident on the second retardation film 28b again.

The left-handed circularly polarized blue light $BL_C2$ is converted by the second retardation film 28b into S-polarized blue light $BL_S1$. The S-polarized blue light $BL_S1$ is reflected off the polarization separation element 25 toward the optical integration system 31.

The blue light $BL_S1$ is thus combined with the fluorescence YL having passed through the polarization separation element 25. That is, the blue light $BL_S1$ and the fluorescence YL exit out of the polarization separation element 25 in the same direction to form the white light WL, which is the combination of the blue light $BL_S1$ and the fluorescence (yellow light) YL.

The white light WL enters the optical integration system 31. The optical integration system 31 is formed, for example, of a lens array 31a and a les array 31b. The lens arrays 31a and 31b are each formed of a plurality of lenslets arranged in an array.

The white light WL having passed through the optical integration system 31 is incident on the polarization conversion element 32. The polarization conversion element 32 is formed of polarization separation films and retardation films. The polarization conversion element 32 converts the white light WL containing the non-polarized fluorescence YL into linearly polarized light.

The white light WL having passed through the polarization conversion element 32 is incident on the superimposing lens 33a. The superimposing lens 33a cooperates with the optical integration system 31 to homogenize the illuminance distribution of the white light WL in an area illuminated therewith. The illuminator 2 thus produces the white light WL.

The light shaping elements are so designed as to provide a desired beam shaping effect of light incident in a predetermined direction on the light shaping elements. Therefore, if the traveling direction of the light deviates from the predetermined direction, the desired beam shaping effect cannot be provided. The above description has been made of an ideal case where the light beams BL are incident on the light shaping elements 60 in the predetermined direction, for example, along the optical axis ax1. In practice, however, the traveling direction of the light beams BL deviates from the predetermined direction in some cases due, for example, to variation in the manufactured or assembled array light source 21 and the collimator system 22. If the traveling direction of the light beams BL deviates from the predetermined direction, the desired beam shaping effect of shaping the light beams BL cannot be provided.

Since the light source apparatus 2A in the present embodiment includes the light shaping element array 24, loss of the light beams BL that can occur when the traveling direction of the light beams BL deviates from the predetermined direction.

Figure 4:
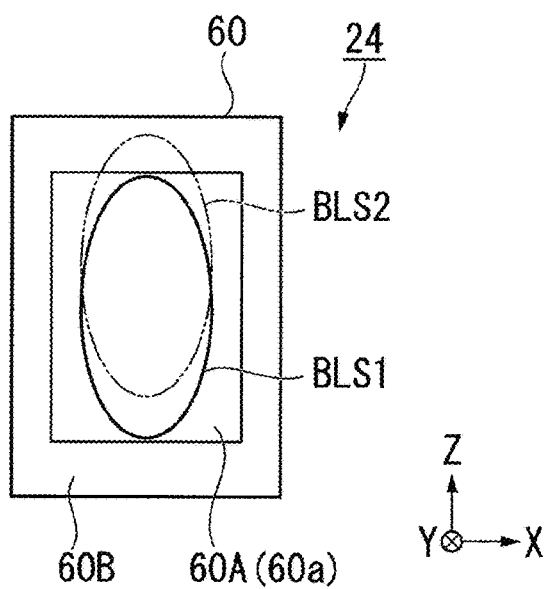
FIG. 4 is an enlarged view of key parts of the light shaping element array.

The configuration of the light shaping element array 24 in the present embodiment will be described. FIG. 4 is a plan view of one of the light shaping elements 60 viewed along the optical axis ax1.

The light shaping elements 60 each include a first optical element 60A and a second optical element 60B, as shown in FIG. 4. The first optical element 60A is provided in an area containing the center of the light shaping element 60 and provides the beam shaping effect. The light source apparatus 2A is so designed that a spot BLS1 formed by the corresponding light beam BL is formed within the first optical element 60A.

The first optical element 60A has the lens surface 60a formed of a free-form surface. The shape of the lens surface 60a formed of a free-form surface is expressed by a polynomial defined by the following Expression (1) and having variables x and y.

$$z = \frac{cr^2}{1 + \sqrt{1-(1+k)c^2r^2}} + \sum_{j=2}^{s} c_j x^m y^n \quad (1)$$

In Expression (1) described above, m and n each represent an integer greater than or equal to zero, k represents the conic constant, and c represents the curvature. Further, $c_j$ represents the coefficient of $x^m y^n$ ($j=[(m+n)^2+m+3n]/2+1$), $S=[(m_1+n_1)^2+m_1+3n_1]/2+1$, and $r=\sqrt{(x^2+y^2)}$. Integers $m_1$ and $n_1$ represent the upper limits of m and n.

The shape of the lens surface 60a formed of a free-form surface can be designed by adjusting the coefficient $c_j$ in Expression (1) as appropriate. A free-form surface can be expressed in other ways in place of Expression (1), and any of the other expressions can be used. However, Expression (1) allows the x-direction curvature and the y-direction curvature of the lens surface 60a to be designed independently from each other, whereby the lens design can be readily performed.

An area of the illuminated area or the area irradiated with light is referred to as an illumination spot, and the shape of the illumination spot is referred to as an illumination spot shape. A light beam BL having angular deviation is formed of a component BL1 and a component BL2, as will be described later. An illumination spot resulting from the light beam BL is referred to as an illumination spot of the light beam BL. An illumination spot resulting from the component BL1 is referred to as an illumination spot of the component BL1. An illumination spot resulting from the component BL2 is referred to as an illumination spot of the component BL2. The illumination spot of the light beam BL includes the illumination spot of the component BL1 and the illumination spot of the component BL2. The shape of an illumination spot is referred to as an illumination spot shape.

In the present embodiment, the lens surface 60a optimizes the illumination spot shape of the light beam BL and the illuminance distribution in the illumination spot of the light beam BL. Specifically, the lens surface 60a provides a beam shaping effect of shaping the light beam BL in such a way that a rectangular illumination spot shape is achieved and the illuminance distribution is homogenized.

The second optical element 60B is so provided as to surround the first optical element 60A. That is, the second optical element 60B is so provided as to extend along the four sides (edges) of the rectangular light shaping element 60.

In the case where the traveling direction of the light beam BL deviates from the predetermined direction, a spot BLS2 formed by the light beam BL is formed in a position shifted from the spot BLS1, for example, in the +Z direction, as shown in FIG. 4. As long as the traveling direction of the light beam BL deviates in any direction, a component of the light beam BL of the component that has not been successfully incident on the first optical element 60A is incident on the second optical element 60B.

In the present embodiment, the second optical element 60B is formed of a flat plate. The second optical element 60B therefore provides no beam shaping effect and causes the light incident thereon to exit in the same direction in which the light travels immediately before the incidence on the second optical element 60B. It is, however, noted that the second optical element 60B translates the optical axis of the light having passed through the second optical element 60B.

Figure 5:
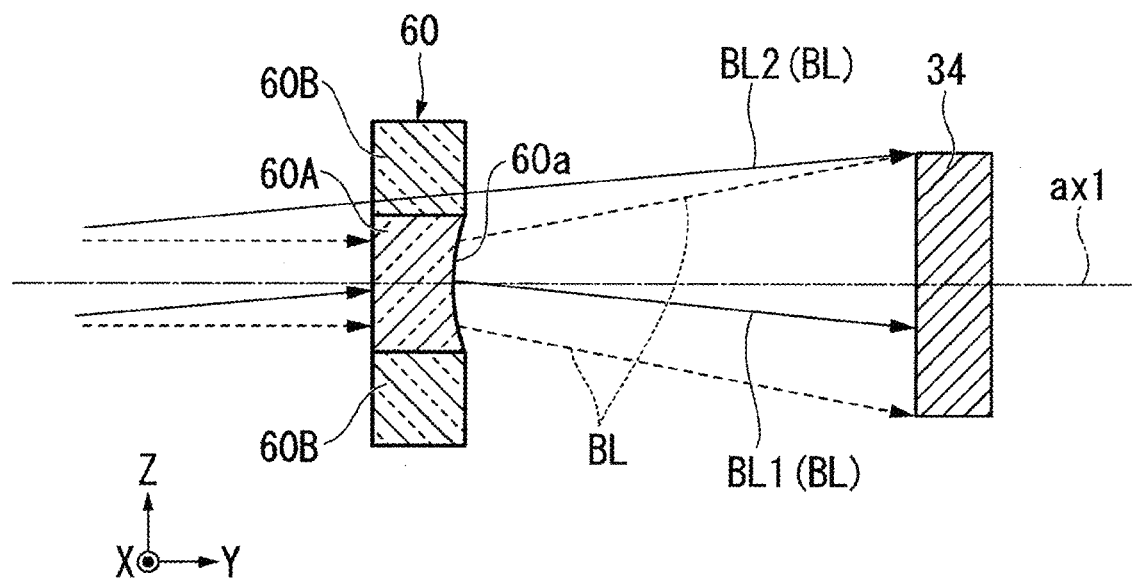
FIG. 5 describes the effect of a light shaping element.

FIG. 5 describes the effect of each of the light shaping elements 60 and corresponds to a cross-sectional view of the light shaping element 60 taken along the line perpendicular to the X direction and passing through the center of the light shaping element 60. FIG. 5 further shows the optical path along which the light beam BL having passed through the light shaping element 60 is incident on the phosphor layer 34 (illuminated area).

In FIG. 5, the first retardation film 28a, the polarization separation element 25, and the first light collection system 26, which are located between the light shaping element 60 and the phosphor layer 34, are omitted, and the optical path of the light beam BL from the light shaping element 60 to the phosphor layer 34 is drawn as an imaginary straight line for simplification of description. The light beam BL is collected by the first light collection system 26, but the light collection does not affect the effect of the light shaping element 60.

In the following description, it is assumed that the traveling direction of the light beam BL deviates from the predetermined direction in the +Z direction but does not deviate in the X direction. In the following sections, the situation in which the traveling direction of a light beam BL deviates from the predetermined direction is expressed in some cases by a stating that there is angular deviation.

In the case where the incident light beam BL has no angular deviation, the light beam BL is shaped by the beam shaping effect of the light shaping element 60 and efficiently incident on the phosphor layer 34, as indicated by the broken lines in FIG. 5. The illumination spot shape and the illuminance distribution of the light beam BL are therefore optimized, whereby the phosphor layer 34 operates at high conversion efficiency.

In the case where the traveling direction of the light beam BL deviates from the predetermined direction, for example, in the +Z direction, a +Z-side portion of the light beam BL passes through the second optical element 60B, and the remainder passes through the first optical element 60A, as indicated by the solid lines in FIG. 5. In the following description, the component that passes through the first optical element 60A is referred to as the component BL1, and the component that passes through the second optical element 60B is referred to as the component BL2.

Since the second optical element 60B is formed of a flat plate, the component BL2 does not spread after it exits out of the second optical element 60B but exits in the same direction in which the component BL2 travels immediately before the incidence on the second optical element 60B, and at least part of the component BL2 is incident on the phosphor layer 34. It is, however, noted that the illumination spot shape or illuminance distribution of the component BL2 is not adjusted.

Since the component BL1 is incident on the first optical element 60A in a direction that deviates from the predetermined direction, the illumination spot shape and illuminance distribution of the component BL1 deviate to some extent from those in the optimum state. The component BL1 is, however, efficiently incident on the phosphor layer 34.

Part of the component BL1 that passes through a portion in the vicinity of the boundary between the first optical element 60a and the second optical element 60B, through which the component BL2 passes, cannot be incident on the phosphor layer 34 in some cases depending, for example, on the angle of incidence of the component BL1. Even in this case, since at least part of the component BL2 is incident on the phosphor layer 34, the light beam BL can be used at high efficiency as compared with the use efficiency in related art.

Figure 6:
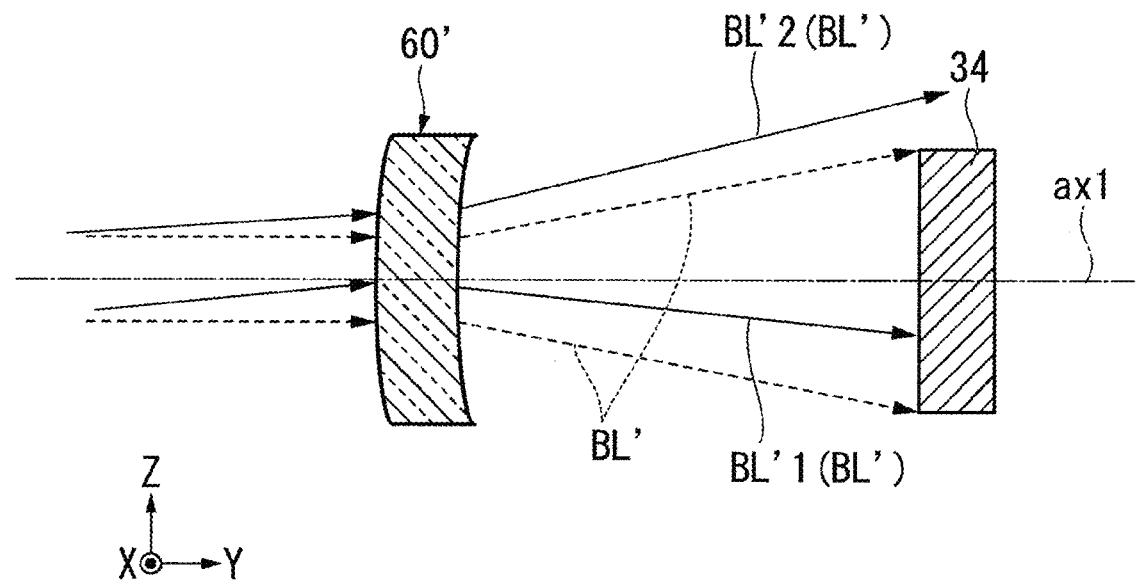
FIG. 6 describes the effect of a light shaping element according to Comparative Example.

As Comparative Example, in place of the light shaping element 60 in the present embodiment, a light shaping element 60' formed only of the first optical element will be described. FIG. 6 describes the effect of the light shaping element 60' according to Comparative Example. FIG. 6 corresponds to a cross-sectional view of the light shaping element 60' taken along the line perpendicular to the X direction and passing through the center of the light shaping element 60'.

In a case where an incident light beam BL' has no angular deviation, the light beam BL' is shaped by the beam shaping effect of the light shaping element 60' and efficiently incident on the phosphor layer 34, as indicated by the broken lines in FIG. 6.

On the other hand, as indicated by solid lines in FIG. 6 in a case where the incident light beam BL' has angular deviation, all components of the light beam BL' (−Z-side component BL'1 and +Z-side component BL'2) are expanded by the beam shaping effect of the light shaping element 60'. That is, the +Z-side component BL' 2 of the light beam BL' is expanded so that the component cannot be incident on the phosphor layer 34. The light beam BL' is therefore used at low efficiency.

Figure 7A:
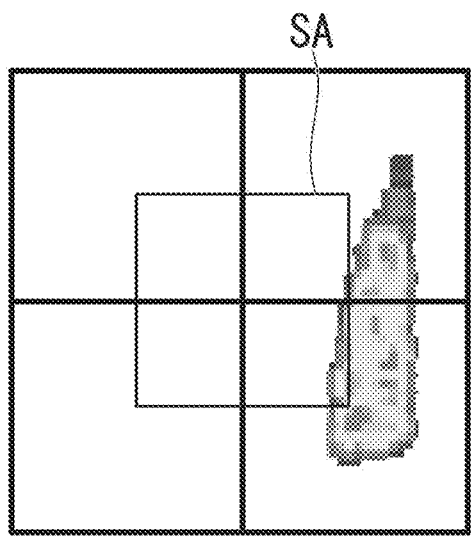
FIG. 7A shows a simulation result illustrating a light beam distribution in an illuminated area according to Comparative Example.
Figure 7B:
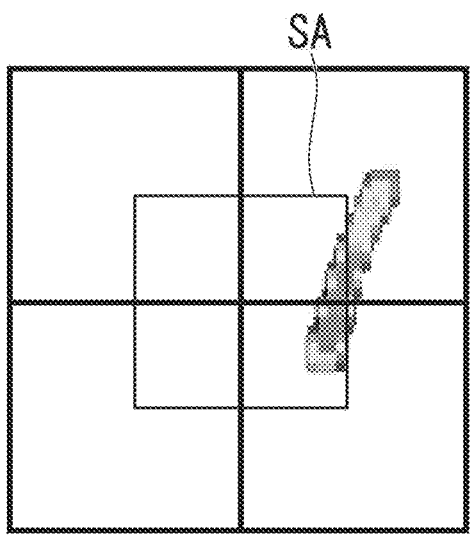
FIG. 7B shows a simulation result illustrating a light beam distribution in the illuminated area according to the embodiment.

FIG. 7A shows a simulation result illustrating a light beam distribution in the illuminated area produced by the light shaping element 60' according to Comparative Example. FIG. 7B shows a simulation result illustrating a light beam distribution in the illuminated area produced by the light shaping element 60 in the present embodiment. In FIGS. 7A and 7B, reference character SA represents the illuminated area. The present simulation was conducted under the conditions that the collimator lens had a focal length of 3 mm and the light beam exit position was shifted by 30 μm in the X direction.

FIG. 7A shows that the light shaping element 60' according to Comparative Example does not allow the light beam to be efficiently incident on the illuminated area SA. Specifically, only 13.6% of the light beam BL' is incident on the illuminated area SA.

On the other hand, FIG. 7B shows that the light shaping element 60 in the present embodiment allows the light beam to be efficiently incident on the illuminated area SA as compared with the light shaping element 60' according to Comparative Example. Specifically, 53% of the light beam BL is incident on the illuminated area SA.

As described above, according to the light source apparatus 2A in the present embodiment, in the case where the traveling direction of the light beams BL outputted from the array light source 21 deviates from the predetermined direction, the magnitude of the effect of the deviation of the light traveling direction can be reduced, whereby loss of the light beams BL can be reduced.

In the description with reference to FIGS. 5 and 6, it is assumed that the outer shape of the illuminated area coincides with the outer shape of the phosphor layer 34. However, in a case where the outer shape of the phosphor layer 34 is larger than the outer shape of a predetermined illuminated area, a component of a light beam BL or the component that extends off the predetermined illuminated area is also incident on the phosphor layer 34. The fluorescence exiting area therefore enlarges. That is, the etendue increases, and the fluorescence use efficiency decreases. According to the light shaping elements 60 in the present embodiment, however, the amount of component that extends off the predetermined illuminated area decreases, whereby the decrease in the fluorescence use efficiency is reduced. The magnitude of the effect provided by the fact that the traveling direction of the light beams BL outputted from the array light source 21 deviates from the predetermined direction can therefore be reduced.

Figure 8:
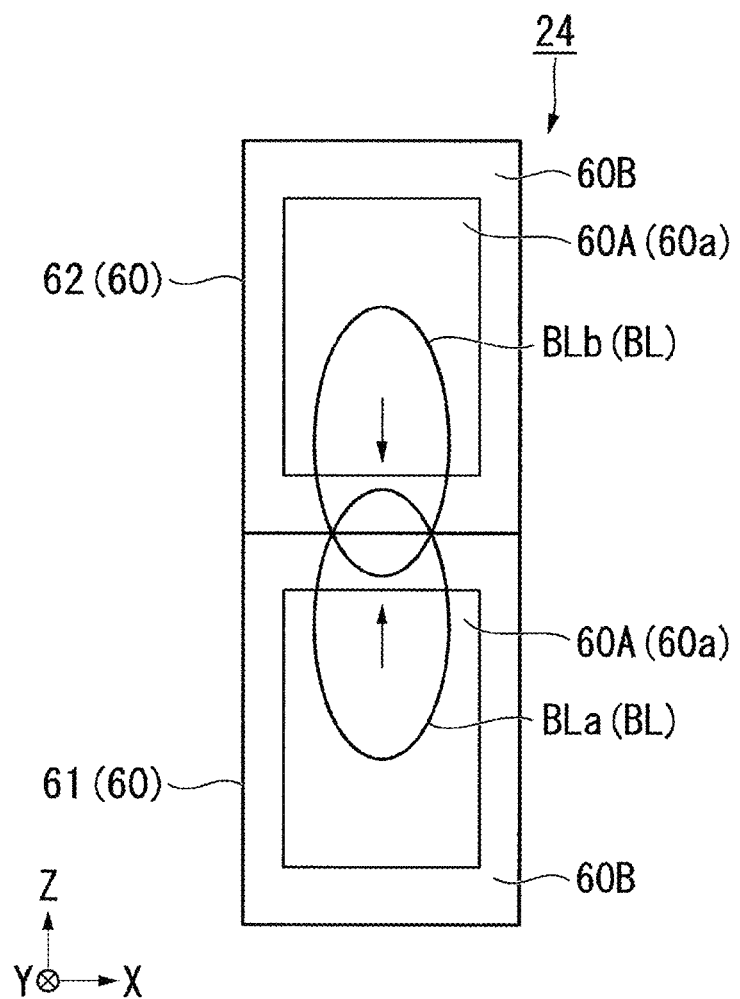
FIG. 8 is an enlarged view of key parts of the light shaping element array.

FIG. 8 shows two light shaping elements 60 disposed side by side in the Z direction. The light shaping element 60 on the −Z side is referred to as a lower light shaping element 61, and the light shaping element 60 on the +Z side is referred to as an upper light shaping element 62. The light beam BL to be incident on the lower light shaping element 61 is referred to as a light beam BLa, and the light beam BL to be incident on the upper light shaping element 62 is referred to as a light beam BLb.

An example of a situation in which the variation in the plurality of light beams BL outputted from the array light source 21 is maximized is a case where the traveling direction of the light beam BLa deviates upward (in +Z direction) so that part of the light beam BLa is incident on the upper light shaping element 62 and the traveling direction of the light beam BLb deviates downward (in −Z direction) so that part of the light beam BLb is incident on the lower light shaping element 61, as shown in FIG. 8.

In the light shaping element array 24 in the present embodiment, the second optical element 60B is so disposed as to surround the first optical element 60A in each of the lower light shaping element 61 and the upper light shaping element 62.

Part of the light beam BLa therefore passes through the second optical element 60B of the upper light shaping element 62 and is efficiently incident on the phosphor layer 34. The light beam BLa having angular deviation can therefore be efficiently used.

Similarly, part of the light beam BLb passes through the second optical element 60B of the lower light shaping element 61 and is efficiently incident on the phosphor layer 34. The light beam BLb having angular deviation can therefore be efficiently used.

According to the light shaping element array 24 in the present embodiment, which includes the plurality of light shaping elements 60, in each of which the second optical element 60B is so disposed as to surround the first optical element 60A, the light beams BL are efficiently incident on the phosphor layer 34, which is the illuminated area, even in the case where the light beams BL corresponding to two light shaping elements 60 adjacent to each other approach each other so that large angular deviation occurs. The illuminator 2 according to the present embodiment can therefore produce bright fluorescence YL.

The above description has been made with reference to the case where the light beams BL having passed through the light shaping element array 24 are incident on the phosphor layer 34. The light beams BL having passed through the light shaping element array 24 are also efficiently incident on the diffusive reflection element 30.

That is, in the case where the traveling direction of the light beams BL outputted from the array light source 21 deviates from the predetermined direction, the component BL2 of each of the light beams BL is allowed to be efficiently incident on the diffusive reflection element 30.

As described above, the light shaping element array 24 in the present embodiment can reduce loss of the light beams BL that can occur when the traveling direction of the light beams BL outputted from the array light source 21 deviates from the predetermined direction. The projector 1 according to the present embodiment, which includes the illuminator 2, can display a bright image.

Second Embodiment

A light shaping element array according to a second embodiment will subsequently be described.

Figure 9:
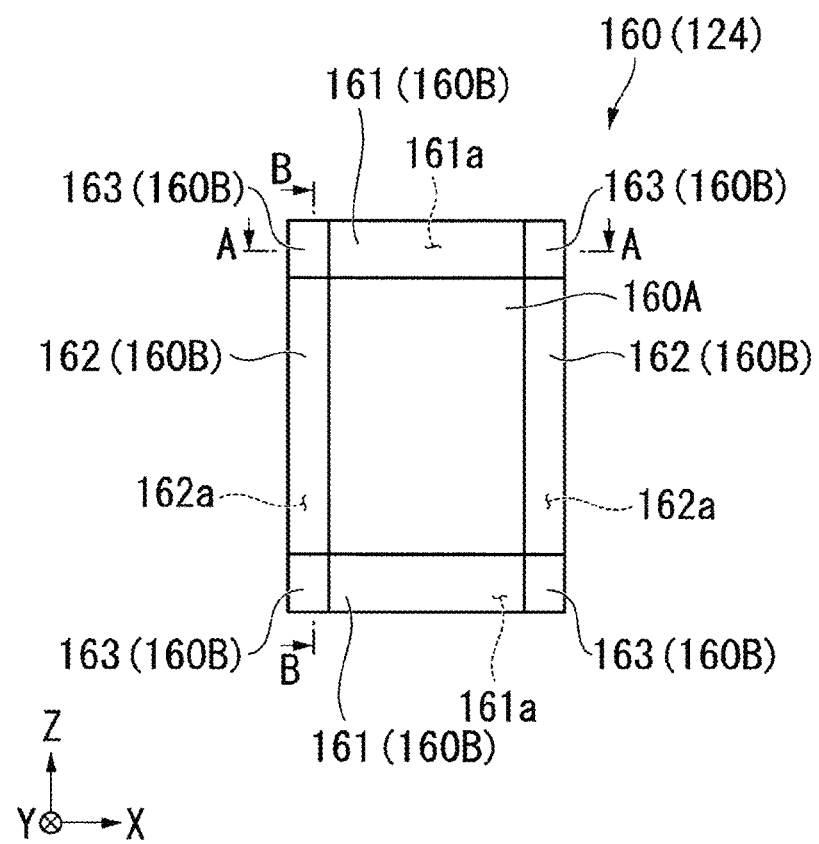
FIG. 9 is an enlarged view of key parts of a light shaping element array in a second embodiment.
Figure 10A:
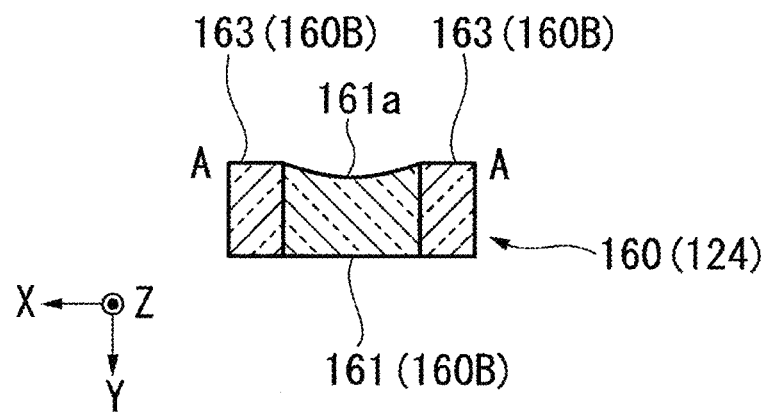
FIG. 10A is a cross-sectional view of a light shaping element taken along the line A-A in FIG. 9.
Figure 10B:
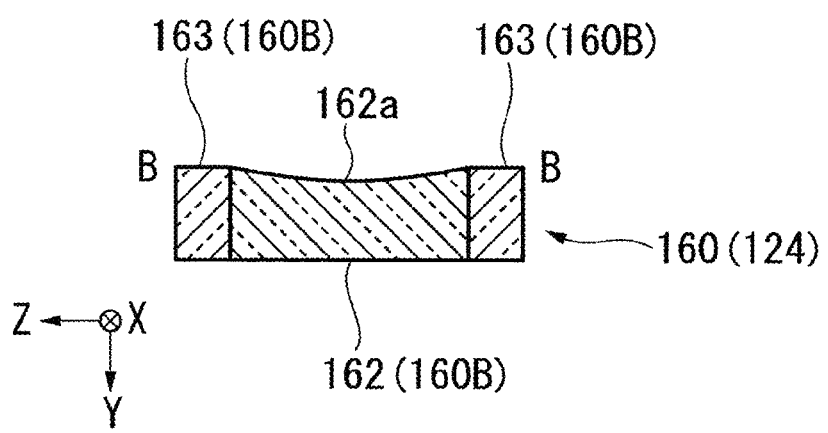
FIG. 10B is a cross-sectional view of the light shaping element taken along the line B-B in FIG. 9.

FIG. 9 is a plan view of one of a plurality of light shaping elements 160 provided in a light shaping element array 124 in the present embodiment and viewed along the optical axis ax1. FIG. 10A is a cross-sectional view of the light shaping element 160 taken along the line A-A in FIG. 9. FIG. 10B is a cross-sectional view of the light shaping element 160 taken along the line B-B in FIG. 9.

The light shaping elements 160 each include a first optical element 160A and a second optical element 160B, as shown in FIG. 9.

The first optical element 160A is provided in an area containing the center of the light shaping element 160 and provides the beam shaping effect. The light source apparatus 2A is so designed that the spot BLS1 formed by the corresponding light beam BL is formed within the first optical element 160A. The first optical element 160A has the same configuration as that of the first optical element 60A in the first embodiment and has a lens surface formed of a free-form surface.

The second optical element 160B is so provided as to surround the first optical element 160A. That is, the second optical element 160B is so provided as to extend along the four sides (edges) of the rectangular light shaping element 160.

In the present embodiment, the second optical element 160B includes two first areas 161, two second areas 162, and four third areas 163.

The first areas 161 are provided along two sides parallel to the X direction out of the four sides of the rectangular light shaping element 160. In the light shaping element 160, the first areas 161 are disposed on the +Z side and the −Z side of the first optical element 160A.

The first areas 161 each have a cylindrical concave surface 161a, as shown in FIG. 10A. The cylindrical concave surface 161a has a generatrix parallel to the Z direction (first direction), in which the first optical element 160A and the second optical element 160B are arranged. The first areas 161 therefore each have refractive power in the X direction perpendicular to the generatrix but have no refractive power in the Z direction parallel to the generatrix. The first areas 161 therefore each have the function of outputting incident light that angularly deviates in the generatrix direction in the same direction in which the incident light travels immediately before the incidence on the first area 161.

The second areas 162 are provided along two sides parallel to the Z direction out of the four sides of the rectangular light shaping element 160. In the light shaping element 160, the second areas 162 are disposed on the +X side and the −X side of the first optical element 160A.

The second areas 162 each have a cylindrical concave surface 162a, as shown in FIG. 10B. The cylindrical concave surface 162a has a generatrix parallel to the X direction (second direction), in which the first optical element 160A and the second optical element 160B are arranged. The second areas 162 therefore each have refractive power in the Z direction perpendicular to the generatrix but have no refractive power in the X direction parallel to the generatrix. The second areas 162 therefore each have the function of outputting incident light that angularly deviates in the generatrix direction in the same direction in which the incident light travels immediately before the incidence on the second area 162.

The third areas 163 are provided at the four corners of the rectangular light shaping element 160.

The third areas 163 are each formed of a flat plate. The third areas 163 each provide no beam shaping effect and output light incident thereon in the same direction in which the incident light travels immediately before the incidence on the third area 163. It is, however, noted that the optical axis of the light passing through any of the third areas 163 is translated by the third area 163.

Figure 11:
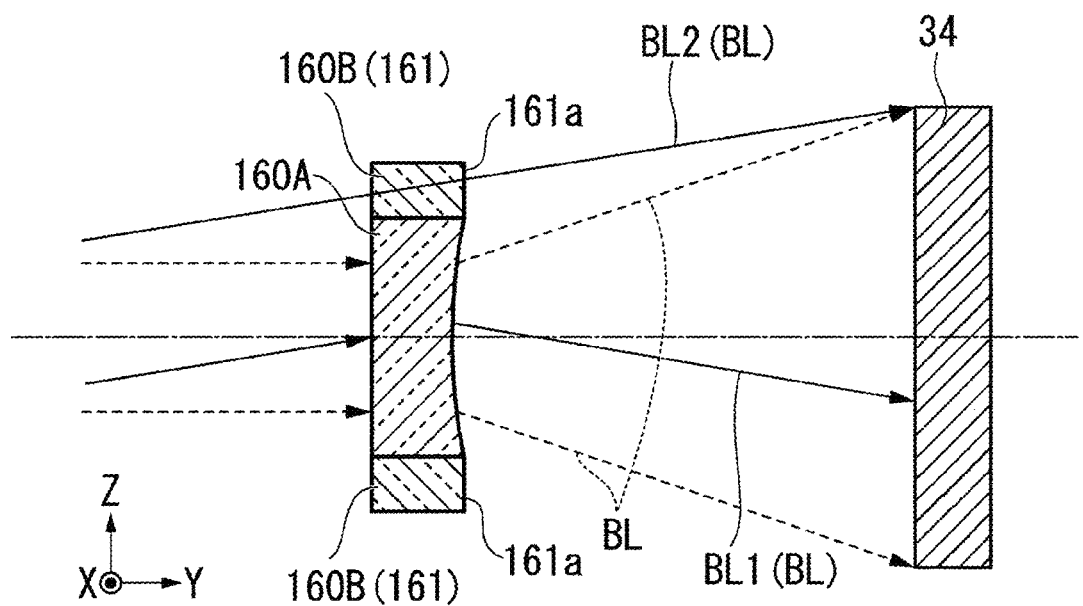
FIG. 11 describes the effect of the light shaping element.
Figure 12:
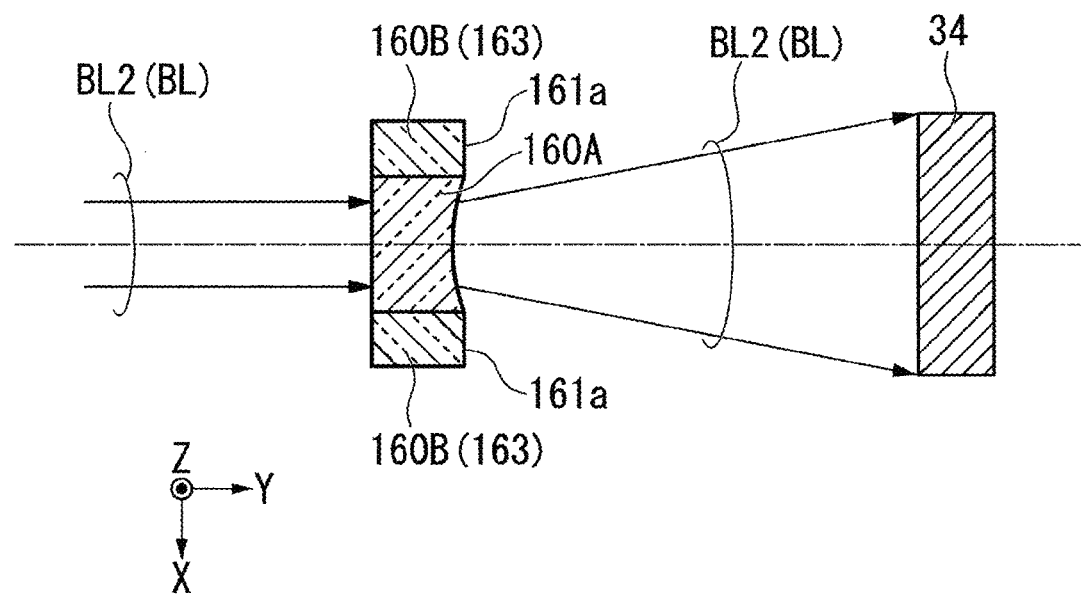
FIG. 12 describes the effect of the light shaping element.

FIGS. 11 and 12 describe the effect of the light shaping element 160. FIG. 11 is a cross-sectional view of the light shaping element 160 taken along the line perpendicular to the X direction and passing through the center of the light shaping element 160 and corresponds to FIG. 5 in the first embodiment. FIG. 12 is a cross-sectional view of the light shaping element 160 taken along the line perpendicular to the Z direction and passing through the center of the first area 161 disposed on the +Z-side of the first optical element 160A.

It is assumed in the following description that the traveling direction of the light beam BL deviates from the predetermined direction in the +Z direction but does not deviate in the X direction for ease of description.

In the case where the incident light beam BL has no angular deviation, the light beam BL is shaped by the beam shaping effect of the light shaping element 160 and efficiently incident on the phosphor layer 34, as indicated by the broken lines in FIG. 11.

In the case where the traveling direction of the light beam BL deviates from the predetermined direction, for example, in the +Z direction, a +Z-side portion of the light beam BL passes through the corresponding one of the first areas 161, and the remainder passes through the first optical element 160A, as indicated by the solid lines in FIG. 11. In the following description, the component that passes through the first optical element 160A is referred to as the component BL1, and the component that passes through the first area 161 disposed on the +Z-side of the first optical element 160A is referred to as the component BL2. The component BL1 is efficiently incident on the phosphor layer 34.

The first areas 161 have no refractive power in the Z direction, as described above. Therefore, in the cross-sectional view of FIG. 11, the component BL2 exits out of the first area 161 in the same direction in which the component BL2 travels immediately before the incidence on the first area 161, and at least part of the component BL2 is incident on the phosphor layer 34.

The component BL2 having passed through the first area 161, however, spreads in the X direction perpendicular to the generatrix of the cylindrical concave surface 161a of the first area 161 and is then incident on the phosphor layer 34, which is the illuminated area, as shown in FIG. 12. The optical power density on the phosphor layer 34 therefore decreases.

The above description has been made with reference to the case where the light beam BL that angularly deviates in the Z direction is incident on one of the first areas 161. The same effect can be provided also in a case where a light beam BL that angularly deviates in the X direction is incident on one of the second areas 162.

According to the light shaping element array 124 in the present embodiment, since the first areas 161 and the second areas 162 are provided with the cylindrical concave surfaces 161a and 162a, respectively, the optical power density, on the phosphor layer 34, of a component that does not have an adjusted illumination spot shape or an adjusted illuminance distribution can be lowered. A decrease in the light emission efficiency of the phosphor layer 34 can therefore be reduced.

A component of the light beam BL or the component incident on the third areas 163 exits out of the third areas 163 in the same direction in which the component travels immediately before the incidence on the third areas 163 and is incident on the phosphor layer 34.

As described above, the light shaping element array 124 in the present embodiment can reduce loss of the light beams BL that can occur when the traveling direction of the light beams BL outputted from the array light source 21 deviates from the predetermined direction. Further, the optical power density on the illuminated area (phosphor layer 34) can be lowered.

The above description has been made with reference to the case where the light beams BL having passed through the light shaping element array 124 are incident on the phosphor layer 34. The light beams BL having passed through the light shaping element array 124 are also efficiently incident on the diffusive reflection element 30.

Third Embodiment

A light shaping element array according to a third embodiment will subsequently be described.

Figure 13:
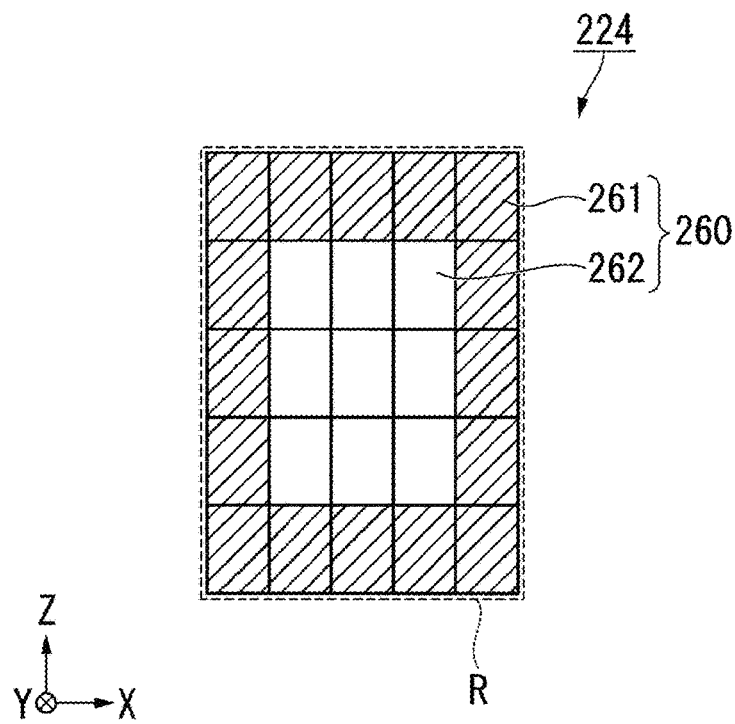
FIG. 13 is a plan view of a light shaping element array according to a third embodiment viewed along an optical axis.

FIG. 13 is a plan view of a light shaping element array 224 including a plurality of light shaping elements 260 in the present embodiment and viewed along the optical axis ax1.

The plurality of light shaping elements 260 are arranged in a two-dimensional array in a plane perpendicular to the optical axis ax1 (in a plane parallel to the XZ plane), as shown in FIG. 13. The plurality of light shaping elements 260 are provided in correspondence with the plurality of semiconductor lasers 21a in the one-to-one relationship, as in the first embodiment.

The plurality of light shaping elements 260 include a plurality of the first light shaping elements 261 and a plurality of the second light shaping elements 262.

In the present embodiment, the second light shaping elements 262, for example, have the same configuration as that of the light shaping elements 60 in the first embodiment or the light shaping elements 160 in the second embodiment. No description of the configuration and effect of the second light shaping elements 262 will therefore be made.

In the present embodiment, the contour R of the light shaping element array 224 corresponds to the outer shape of the area where the plurality of first light shaping elements 261 are arranged. In the present embodiment, the plurality of light shaping elements 260 include 16 first light shaping elements 261 and 9 second light shaping elements 262. In the present embodiment, the first light shaping elements 261 correspond to the "first beam shaping element" described in the appended claims.

Figure 14:
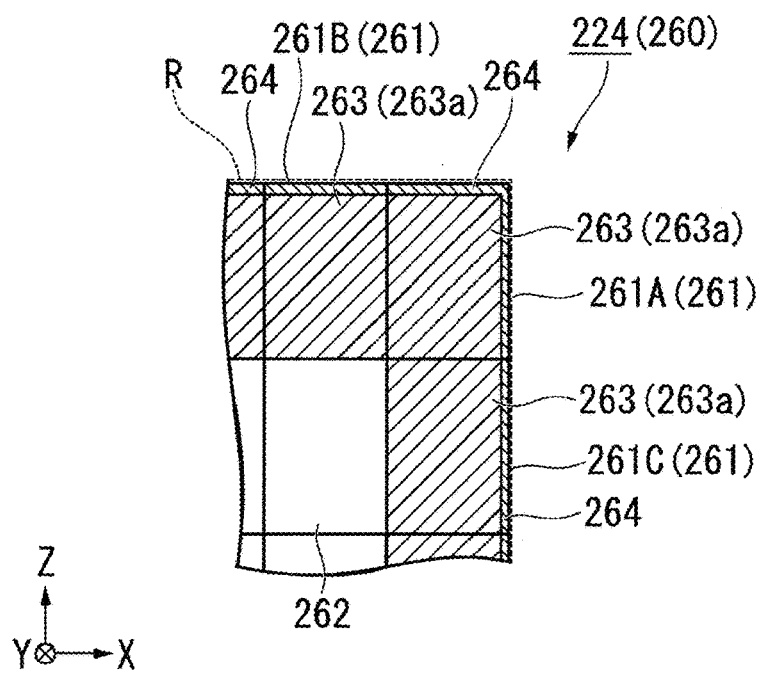
FIG. 14 is a partially enlarged view of the light shaping element array.

FIG. 14 is a partially enlarged view of the light shaping element array 224. FIG. 14 shows three first light shaping elements 261 that form the contour R of the light shaping element array 224 and one second light shaping element 262 adjacent to two of the three light shaping elements 261. In FIG. 14, the first light shaping element 261 located at the corner of the light shaping element array 224 is referred to as a corner light shaping element 261A, the first light shaping element 261 located on the left (−X side) of the corner light shaping element 261A is referred to as a corner left light shaping element 261B, and the first light shaping element 261 located below (on −Z side of) the corner light shaping element 261A is referred to as a corner lower light shaping element 261C.

The first light shaping elements 261 each include a first optical element 263 and a second optical element 264, as shown in FIG. 14. The first optical element 263 is provided in an area containing the center of the first light shaping element 261 and provides the beam shaping effect. The first optical element 263 has a lens surface 263a formed of a free-form surface.

The second optical element 264 is provided along the contour R of the light shaping element array 224. That is, the second optical element 264 is provided at a side that forms the contour R out of the four sides (edges) of the rectangular first light shaping element 261. The second optical element 264 has a deflection surface having refractive power that deflects light in such a way that the light travels from a point outside the illuminated area toward a point inside the illuminated area.

Specifically, in the corner light shaping element 261A, the second optical element 264 is provided on the +Z-side side and the +X-side side of the corner light shaping element 261A. In the corner left light shaping element 261B, the second optical element 264 is provided on the +Z-side side of the corner left light shaping element 261B. In the corner lower light shaping element 261C, the second optical element 264 is provided on the +X-side side of the corner lower light shaping element 261C.

As will be described later, in each of the first light shaping elements 261, the second optical element 264 has the function of deflecting the component having been emitted from the semiconductor laser 21a (first light source) corresponding to the first light shaping element 261 and having been incident on the second optical element 264 toward the illuminated area and outputting the deflected component.

Figure 15:
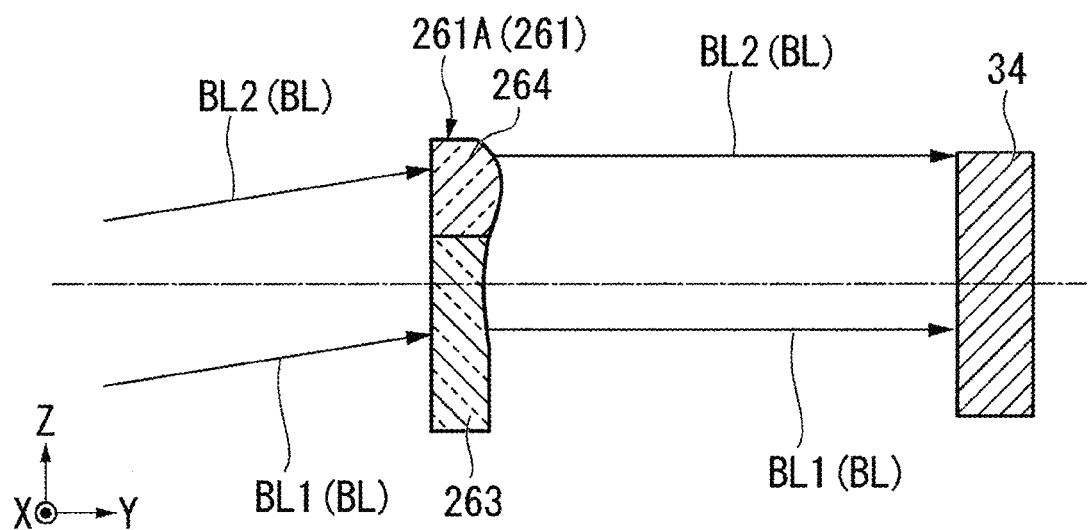
FIG. 15 describes the effect of a first light shaping element.

FIG. 15 describes the effect of each of the first light shaping elements 261. FIG. 15 is a cross-sectional view of the corner light shaping element 261A taken along the line perpendicular to the X direction and passing through the center of the corner light shaping element 261A. FIG. 15 further shows the optical path along which the light beam BL having passed through the corner light shaping element 261A is incident on the phosphor layer 34 (illuminated area). In FIG. 15, the first retardation film 28a, the polarization separation element 25, and the first light collection system 26, which are located between the light shaping element 260 and the phosphor layer 34, are omitted, and the optical path of the light beam BL from the corner light shaping element 261A to the phosphor layer 34 is drawn as an imaginary straight line for simplification of description.

Figure 16:
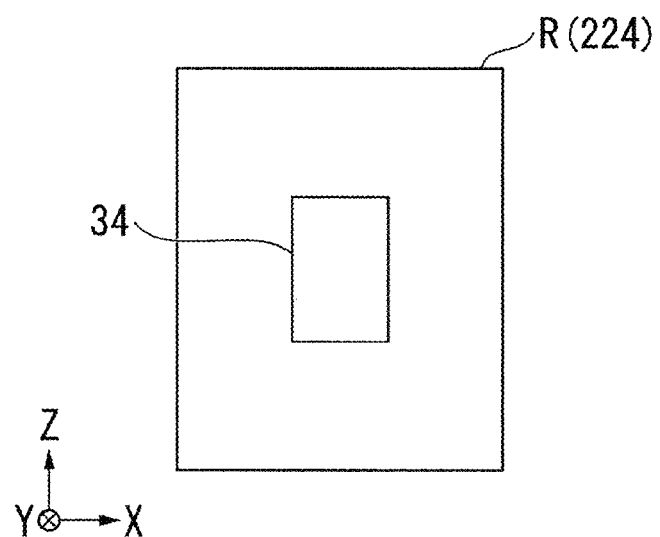
FIG. 16 shows the positional relationship between a phosphor layer and the contour of the light shaping element array.

FIG. 16 shows the positional relationship between the phosphor layer 34 and the contour R of the light shaping element array 224. In FIG. 16, the optical path of the light beam BL and the optical path of the light beam $BL_S$ between the phosphor layer 34 and the light shaping element array 224 are imaginarily drawn as a straight line, and the phosphor layer 34 is viewed along the principal ray of the light beam $BL_S$. The coordinate system in FIG. 16 is associated with the light shaping element array 224.

The phosphor layer 34 is so disposed as to fall within the contour R of the light shaping element array 224, as shown in FIG. 16.

It is assumed in the following description that the traveling direction of the light beam BL deviates from the predetermined direction in the +Z direction but does not deviate in the X direction for ease of description.

A +Z-side portion of the light beam BL passes through the second optical element 264, and the remainder passes through the first optical element 263, as shown in FIG. 15. In the following description, the component that passes through the first optical element 263 is referred to as the component BL1, and the component that passes through the second optical element 264 is referred to as the component BL2. The component BL1 is efficiently incident on the phosphor layer 34.

The second optical element 264 has refractive power that deflects the component BL2 in such a way that the component BL2 travels from a point outside the illuminated area toward a point inside the illuminated area (in −Z direction). In other words, the second optical element 264 has the function of deflecting the component BL2 incident on the second optical element 264 toward the illuminated area and outputting the deflected component BL2. At least part of the component BL2 is therefore incident on the phosphor layer 34 based on the effect of the second optical element 264. Since the second optical element 264 provides the deflection effect described above, the present embodiment provides an effect of reducing angular deviation greater than that in the first embodiment, in which no deflection effect is provided.

The second optical element 264 provided on the +X-side side of the corner light shaping element 261A has refractive power that deflects light in such a way that the light travels from a point outside the illuminated area toward a point inside the illuminated area (in −X direction). Therefore, the component that has not successfully been incident on the first optical element 263, because the traveling direction of the light beam BL deviates from the predetermined direction in the +X direction, is deflected by the second optical element 264 toward the illuminated area and can therefore be incident on the phosphor layer 34.

Similarly, the second optical element 264 provided on the +Z-side side of the corner left light shaping element 261B has refractive power that deflects light in such a way that the light travels from a point outside the illuminated area toward a point inside the illuminated area (in −Z direction). Therefore, the component that has not successfully been incident on the first optical element 263, because the traveling direction of the light beam BL deviates from the predetermined direction in the +Z direction, is deflected by the second optical element 264 toward the illuminated area and can therefore be incident on the phosphor layer 34.

Similarly, the second optical element 264 provided on the +X-side side of the corner lower light shaping element 261C has refractive power that deflects light in such a way that the light travels from a point outside the illuminated area toward a point inside the illuminated area (in −X direction). Therefore, the component that has not successfully been incident on the first optical element 263, because the traveling direction of the light beam BL deviates from the predetermined direction in the +X direction, is deflected by the second optical element 264 toward the illuminated area and can therefore be incident on the phosphor layer 34.

In the light shaping element array 224 in the present embodiment, the other first light shaping elements 261 that form the contour R shown in FIG. 13 are also each provided with the second optical element 264 on the side along the contour R in accordance with the position of the first light shaping element 261, as in the case of the corner light shaping element 261A, the corner left light shaping element 261B, and the corner lower light shaping element 261C described above. The thus provided second optical elements 264 can reduce loss of the light beams BL that can occur when the traveling direction of the light beams BL outputted from the array light source 21 deviates from the predetermined direction toward an area outside the contour R and the light beams BL are incident on the first light shaping elements 261.

The above description has been made with reference to the case where the light beams BL having passed through the light shaping element array 224 are incident on the phosphor layer 34. The light beams BL having passed through the light shaping element array 224 are also efficiently incident on the diffusive reflection element 30.

Further, the present embodiment has been described with reference to the case where the contour R of the light shaping element array 224 has a rectangular shape, but the contour R of the light shaping element array 224 is not limited to a rectangular contour.

The invention is not limited to the contents of the embodiments described above and can be changed as appropriate to the extent that the change does not depart from the substance of the invention.

First Variation

The first embodiment has been described with reference to the case where the first optical element 60A of each of the light shaping elements 60 has the lens surface 60a, which is formed of a free-form surface, but the configuration of the light shaping elements 60 is not limited to the configuration described above. Any configuration that provides the beam shaping effect of shaping the cross-sectional shape of the illumination light with which the illuminated area is irradiated can be employed as appropriate as the configuration of the first optical element 60A. For example, a diffuser element may be used as the first optical element 60A that provides the beam shaping effect. In the case where a diffuser element is used as the first optical element 60A, the second optical element 60B can be formed of a flat surface provided around the periphery of the diffuser element.

Second Variation

The second embodiment has been described with reference to the case where the cylindrical concave surfaces 161a and 162a are used as the first area 161 and the second area 162, which form each of the second optical elements 60B, but the configuration of the second optical elements 60B is not limited to the configuration described above.

Figure 17:
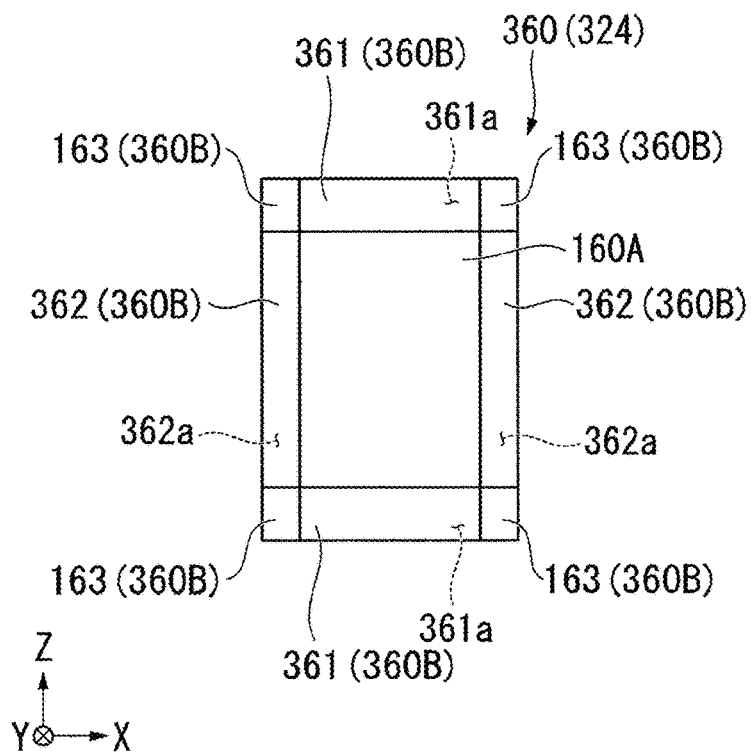
FIG. 17 is a partially enlarged view of a light shaping element array according to a second variation.

FIG. 17 is a plan view of one of a plurality of light shaping elements 360 provided in a light shaping element array 324 according to a variation of the second embodiment and viewed along the optical axis ax1. The light shaping elements 360 each include the first optical element 160A and a second optical element 360A, as shown in FIG. 17. In the present variation, the configurations common to those of the light shaping element array 124 in the second embodiment have the same reference characters and will not be described in detail.

In the present variation, the second optical element 360B has two first areas 361, two second areas 362, and the four third areas 163. It is assumed that the direction in which the first optical element 160A and the first areas 361 are arranged is called the Z direction, and that the direction in which the first optical element 160A and the second areas 362 are arranged is called the X direction.

The first areas 361 are provided along two sides parallel to the X direction out of the four sides of the rectangular light shaping element 360. In the light shaping element 360, the first areas 361 are disposed on the +Z side and the −Z side of the first optical element 160A.

The first areas 361 each include an anisotropic diffuser element 361a. The anisotropic diffuser element 361a diffuses light incident thereon in the X direction but hardly diffuses the incident light in the Z direction. The first areas 361 therefore each have the function of scattering the incident light that angularly deviates in the Z direction but outputting the scattered light in such a way that it has a principal ray that travels in the same direction in which the incident light travels immediately before the incidence on the first areas 361.

The second areas 362 are provided along two sides parallel to the Z direction out of the four sides of the rectangular light shaping element 360. In the light shaping element 360, the second areas 362 are disposed on the +X side and the −X side of the first optical element 160A.

The second areas 362 each include an anisotropic diffuser element 362a. The anisotropic diffuser element 362a diffuses light incident thereon in the Z direction but does not diffuse the incident light in the X direction. The second areas 362 therefore each have the function of scattering the incident light that angularly deviates in the X direction but outputting the scattered light in such a way that it has a principal ray that travels in the same direction in which the incident light travels immediately before the incidence on the second areas 362.

The third areas 163 have the same configuration as that of the third areas in the second embodiment and will therefore not be described.

Figure 18:
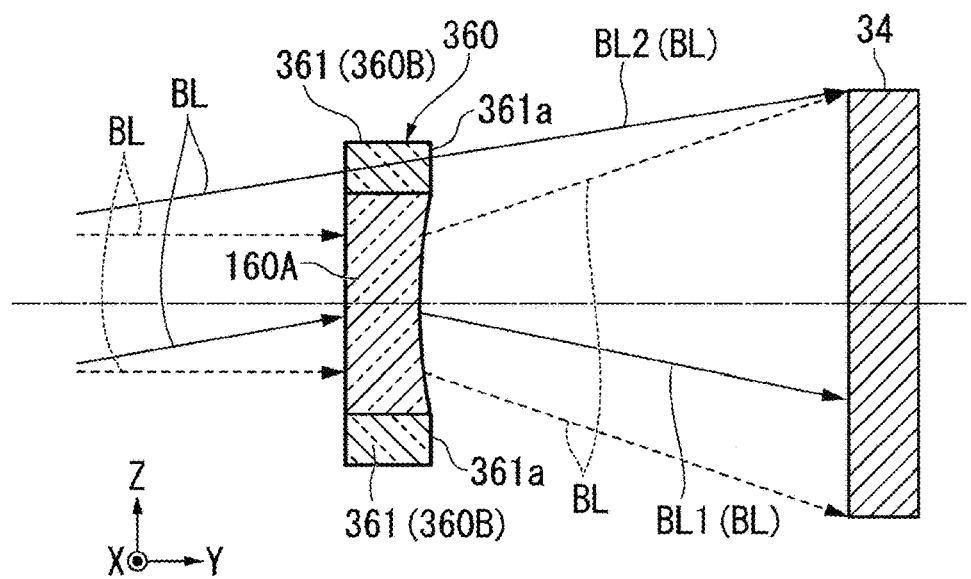
FIG. 18 describes the effect of a light shaping element.
Figure 19:
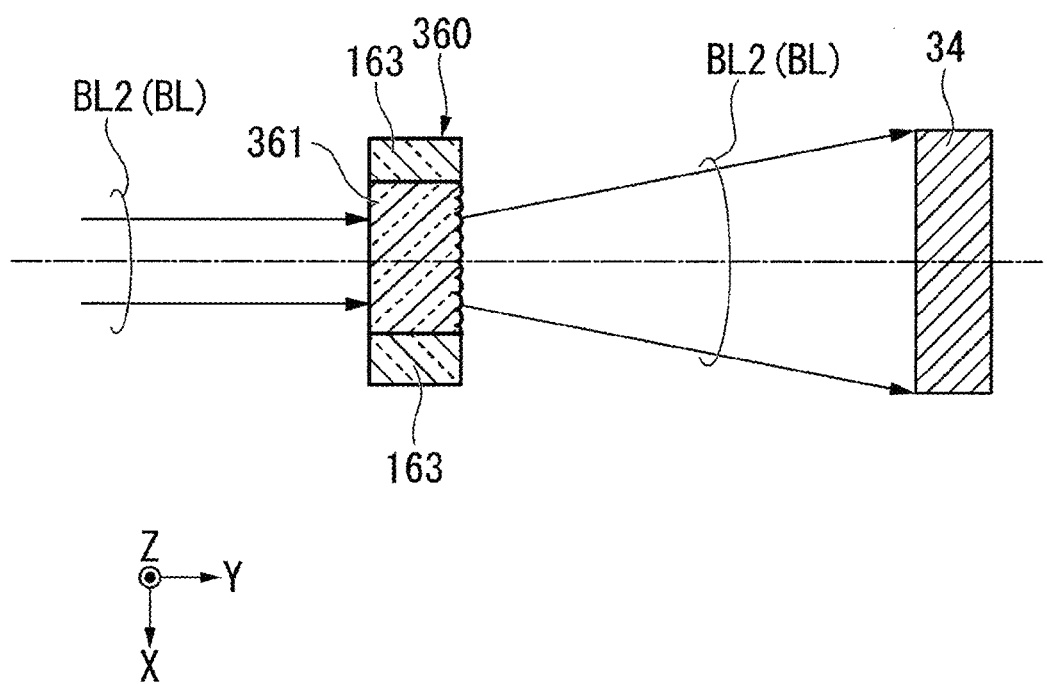
FIG. 19 describes the effect of the light shaping element.

FIGS. 18 and 19 describe the effect of the light shaping elements 360. FIG. 18 is a cross-sectional view of one of the light shaping elements 360 taken along the line perpendicular to the X direction and passing through the center of the light shaping element 360 and corresponds to FIG. 11 in the second embodiment. FIG. 19 is a cross-sectional view of the light shaping element 360 taken along the line perpendicular to the Z direction and passing through the center of one of the first areas 161.

It is assumed in the following description that the traveling direction of the light beam BL deviates from the predetermined direction in the +Z direction but does not deviate in the X direction for ease of description.

In the case where the incident light beam BL has no angular deviation, the light beam BL is shaped by the beam shaping effect of the light shaping element 360 and efficiently incident on the phosphor layer 34, as indicated by the broken lines in FIG. 18.

In the case where the traveling direction of the light beam BL deviates from the predetermined direction, for example, in the +Z direction, a +Z-side portion of the light beam BL passes through the corresponding one of the first areas 361, and the remainder passes through the first optical element 160A, as indicated by the solid lines in FIG. 18. In the following description, the component that passes through the first optical element 160A is referred to as the component BL1, and the component that passes through the first area 361 disposed on the +Z-side of the first optical element 160A is referred to as the component BL2. The component BL1 is efficiently incident on the phosphor layer 34.

The first areas 361 do not diffuse light in the Z direction, as having been already described. Therefore, in the cross-sectional view of FIG. 18, the component BL2 exits without spreading out of the first areas 361 in the same direction in which the component BL2 travels immediately before the incidence on the first areas 361, and at least part of the component BL2 is incident on the phosphor layer 34.

However, since the first areas 361 diffuse the light in the X direction, at least part of the component BL2 having passed through the first area 361 is diffused in the X direction and incident on the phosphor layer 34, as shown in FIG. 19. The optical power density on the phosphor layer 34 is therefore reduced.

The above description has been made with reference to the case where the light beam BL that angularly deviates in the Z direction is incident on one of the first areas 361. The same effect can be provided also in a case where a light beam BL that angularly deviates in the X direction is incident on one of the second areas 162.

According to the light shaping element array 324 in the present variation, since the first areas 361 and the second areas 362 are provided with the anisotropic diffuser elements 361a and 362a, respectively, the optical power density, on the phosphor layer 34, of a component that does not have an adjusted illumination spot shape or an adjusted illuminance distribution can be lowered. A decrease in the light emission efficiency of the phosphor layer 34 can therefore be reduced.

As described above, the light shaping element array 324 in the present variation can reduce loss of the light beams BL that can occur when the traveling direction of the light beams BL outputted from the array light source 21 deviates from the predetermined direction. Further, the optical power density on the illuminated area (phosphor layer 34) can be lowered.

The above description has been made with reference to the case where the light beams BL having passed through the light shaping element array 324 are incident on the phosphor layer 34. The light beams BL having passed through the light shaping element array 324 are also efficiently incident on the diffusive reflection element 30.

The present description has been made with reference to the case where the first optical elements 160A each have a lens surface formed of a free-form surface, and a diffuser element may instead be used as each of the first optical elements.

Third Variation

In the first to third embodiments described above, the array light source 21 includes a plurality of semiconductor lasers 21a. The array light source 21 may instead be formed only of one semiconductor laser 21a. In this case, the light shaping element array 24, 124, or 224 described above only needs to include one light shaping element 60, 160, or 260. Further, the first light collection system 26 or the second light collection system 29 is not essentially required.

Fourth Variation

In the second embodiment, the cylindrical concave surfaces are used. Instead, cylindrical convex surfaces can be used.

In the embodiments described above, the fluorescence emitting element 27 is fixed. Instead, the fluorescence emitting element 27 may have a configuration in which the area of the phosphor layer on which the light beams $BL_S$ are incident moves with time. In this case, if the illumination spot formed by each light beam extends off a predetermined area, the etendue increases, resulting in a decrease in the fluorescence use efficiency. The light shaping elements in any of the embodiments of the invention, however, reduces the amount of the illumination spot that is formed by each light beam BL and extends off the predetermined area, whereby a decrease in the efficiency at which the fluorescence YL is used is reduced. The diffusive reflection element may similarly have a configuration in which the area of the diffusive reflection element on which the blue light $BL_C1$ is incident moves with time.

In the embodiments described above, the projector 1 including the three light modulators 4R, 4G, and 4B is presented by way of example, and the invention is also applicable to a projector that displays color video images via one light modulator. Further, a digital mirror device may be used as each of the light modulators.

The above embodiments of the invention have each been described with reference to the case where the light source apparatus according to the embodiment is incorporated in a projector, but not necessarily. The light source apparatus according to any of the embodiments of the invention can also be used, for example, in a lighting apparatus and an automobile headlight.

The entire disclosure of Japanese Patent Application No. 2017-150826, filed on Aug. 3, 2017 is expressly incorporated by reference herein.

What is claimed is:

1. A light source apparatus that irradiates an illuminated area with illumination light, the light source apparatus comprising:
   at least one light source that emits light; and
   at least one beam shaping element that includes a first optical element and a second optical element and provides a beam shaping effect of shaping a cross-sectional shape of the light to produce the illumination light,
   wherein the first optical element is provided in an area containing a center of the beam shaping element in a plan view viewed in a direction in which a principal ray of the light is incident on the beam shaping element and the first optical element provides the beam shaping effect, and
   the second optical element is provided at an end portion of the first optical element and has a function of outputting, when part of the light is incident on the second optical element, the part of the light in a same direction in which the part of the light travels immediately before the incidence on the second optical element.

2. The light source apparatus according to claim 1, wherein the second optical element has a cylindrical surface having a generatrix parallel to a first direction in which the first and second optical elements are arranged.

3. The light source apparatus according to claim 1, wherein the second optical element includes a flat plate section formed of a flat plate.

4. The light source apparatus according to claim 1, wherein the second optical element includes an anisotropic diffuser element.

5. The light source apparatus according to claim 1, wherein the first optical element is formed of a diffuser element.

6. The light source apparatus according to claim 1, wherein the first optical element is formed of a lens having a free-form surface.

7. The light source apparatus according to claim 6, wherein let an x axis and a y axis be two axes perpendicular to each other in a plane perpendicular to an optical axis of the lens, and the free-form surface has a shape defined by Expression (1) having variables x and y:

$$z = \frac{cr^2}{1 + \sqrt{1 - (1+k)c^2 r^2}} + \sum_{j=2}^{s} c_j x^m y^n. \quad (1)$$

8. The light source apparatus according to claim 1, further comprising a light collection system provided on a downstream side of the at least one beam shaping element,
   wherein the at least one light source includes a plurality of light sources,
   the at least one beam shaping element includes a plurality of beam shaping elements provided in correspondence with the plurality of light sources, and
   the light collection system has a function of collecting a plurality of light beams having been emitted from the plurality of light sources and having passed through the plurality of corresponding beam shaping elements and directing the collected light beams toward the illuminated area.

9. An illuminator comprising:
   the light source apparatus according to claim 1; and
   a diffused light generating element that receives the illumination light outputted from the light source apparatus and generates diffused light.

10. A projector comprising:
    the illuminator according to claim 9;
    a light modulator that modulates light from the illuminator in accordance with image information to produce image light; and
    a projection system that projects the image light.

11. A light source apparatus that irradiates an illuminated area with illumination light, the light source apparatus comprising:
    at least one light source that emits light; and at least one beam shaping element that includes a first optical element and a second optical element and provides a beam shaping effect of shaping a cross-sectional shape of the light to produce the illumination light, wherein the first optical element is provided in an area containing a center of the beam shaping element in a plan view viewed in a direction in which a principal ray of the light is incident on the beam shaping element and the first optical element provides the beam shaping effect, and the second optical element is provided at an end portion of the first optical element and has a function of deflecting, when part of the light is incident on the second optical element, the part of the light toward the illuminated area and outputting the deflected light.

12. The light source apparatus according to claim 11, wherein the second optical element has a deflection surface having refractive power that deflects the part of the light toward the illuminated area.

13. The light source apparatus according to claim 11, wherein the first optical element is formed of a diffuser element.

14. The light source apparatus according to claim 11, wherein the first optical element is formed of a lens having a free-form surface.

15. The light source apparatus according to claim 14, wherein let an x axis and a y axis be two axes perpendicular to each other in a plane perpendicular to an optical axis of the lens, and the free-form surface has a shape defined by Expression (1) having variables x and y:

$$z = \frac{cr^2}{1+\sqrt{1-(1+k)c^2r^2}} + \sum_{j=2}^{s} c_j x^m y^n. \quad (1)$$

16. The light source apparatus according to claim 11, further comprising a light collection system provided on a downstream side of the at least one beam shaping element, wherein the at least one light source includes a plurality of light sources, the at least one beam shaping element includes a plurality of beam shaping elements provided in correspondence with the plurality of light sources, and the light collection system has a function of collecting a plurality of light beams having been emitted from the plurality of light sources and having passed through the plurality of corresponding beam shaping elements and directing the collected light beams toward the illuminated area.

17. The light source apparatus according to claim 16, wherein the plurality of beam shaping elements form a beam shaping element array, the second optical element of each of first beam shaping elements that form a contour of the beam shaping element array out of the plurality of beam shaping elements is provided along the contour, the plurality of light sources include first light sources corresponding to the first beam shaping elements, and the second optical element of each of the first beam shaping elements has refractive power that deflects a component emitted from the corresponding first light source and incident on the second optical element of the first beam shaping element toward the illuminated area.

18. The light source apparatus according to claim 16, wherein the plurality of beam shaping elements form a beam shaping element array, the second optical element of each of first beam shaping elements that form a contour of the beam shaping element array out of the plurality of beam shaping elements is provided along the contour, the plurality of light sources include first light sources corresponding to the first beam shaping elements, and the second optical element of each of the first beam shaping elements has refractive power that deflects a component emitted from the corresponding first light source and incident on the second optical element of the first beam shaping element toward the illuminated area.

19. An illuminator comprising:
the light source apparatus according to claim 11; and
a diffused light generating element that receives the illumination light outputted from the light source apparatus and generates diffused light.

20. A projector comprising:
the illuminator according to claim 11;
a light modulator that modulates light from the illuminator in accordance with image information to produce image light; and
a projection system that projects the image light.

* * * * *